Apr. 17, 1923. 1,452,217
F. B. PFEIFFER
TIRE
Filed Aug. 16, 1921 2 Sheets-Sheet 1
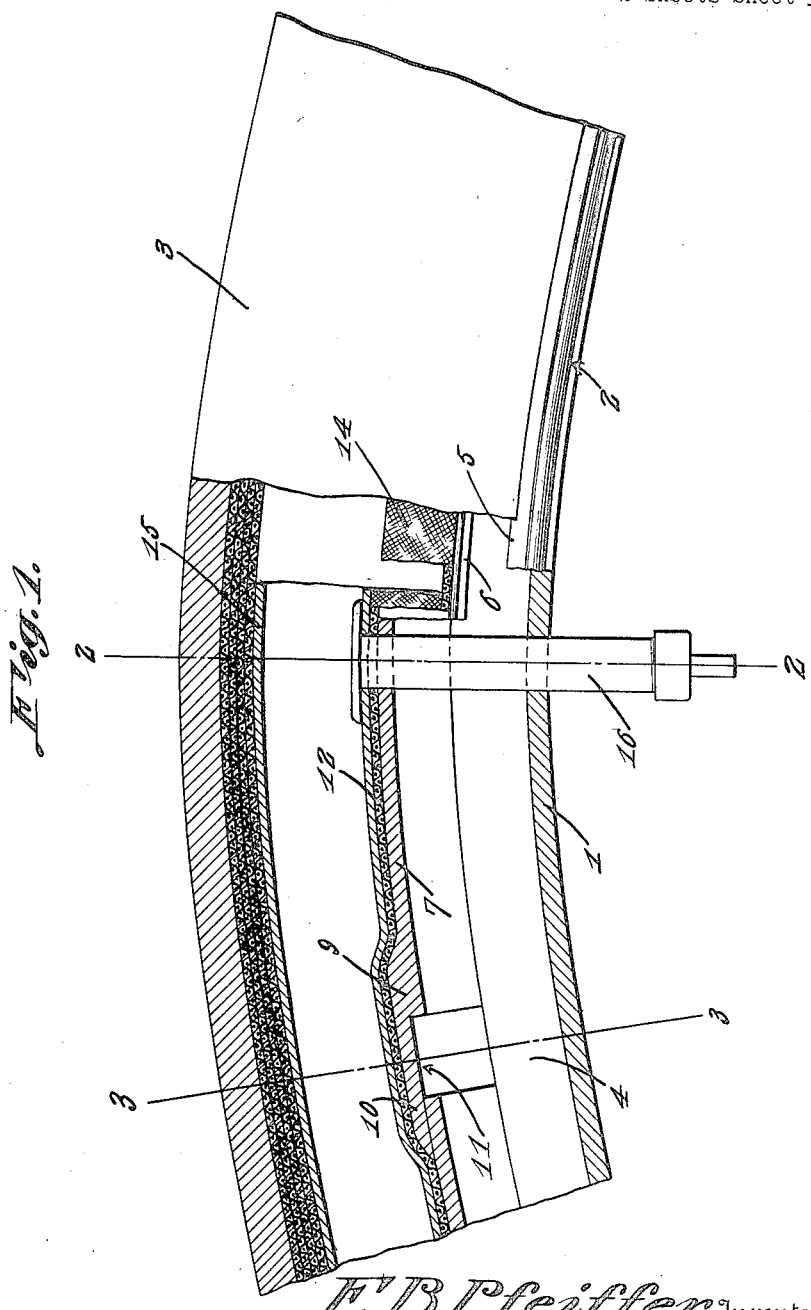

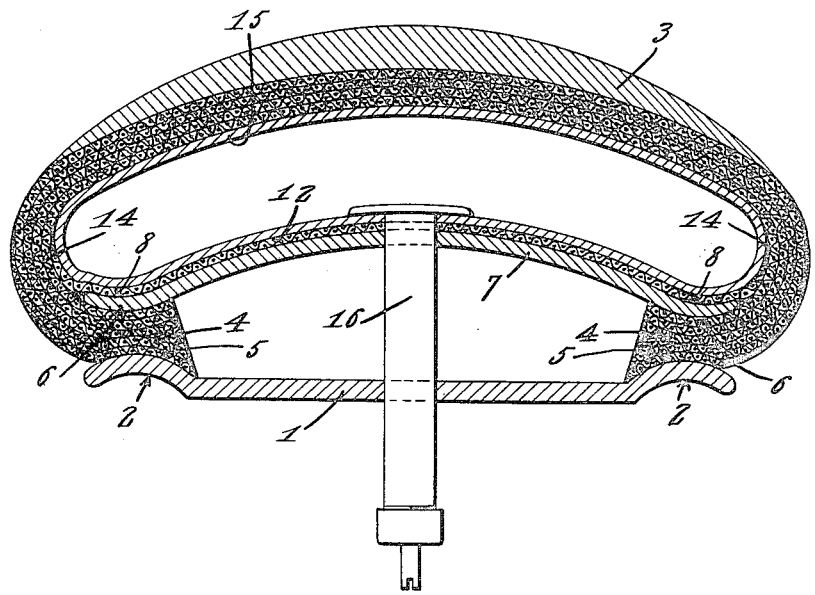
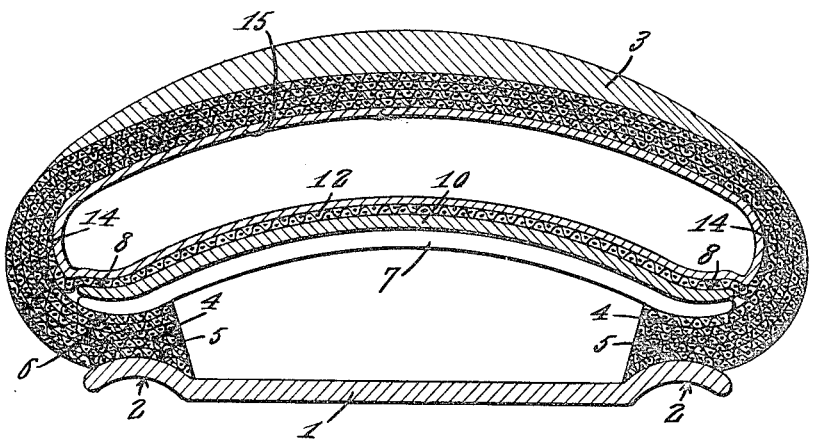

Patented Apr. 17, 1923.

1,452,217

UNITED STATES PATENT OFFICE.

FRED BROWN PFEIFFER, OF AKRON, OHIO.

TIRE.

Application filed August 16, 1921. Serial No. 492,730.

*To all whom it may concern:*

Be it known that I, FRED B. PFEIFFER, a citizen of the United States, residing at Akron, in the county of Summit and State of Ohio, have invented a new and useful Tire, of which the following is a specification.

The device forming the subject matter of this application is a vehicle tire, and one object of the invention is to provide novel means for holding the casing of the tire on a rim automatically, when the casing is inflated.

Another object of the invention is to provide a tire in which there will be no shifting of the beads, the result being that the cords in the casing may all run in one direction and be laid at such an angle as to give the best results under traction. A further object of the invention is to provide a tire, the casing of which may be provided with low side walls and a wide tread surface, a comparatively small amount of air being required to maintain the tire in condition, and the construction being such that, when a blow-out occurs, there will be no appreciable drop of the car, this result being brought about owing to the fact that the casing is of no great height, as compared with casings now in use.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention, parts being broken away; Figure 2 is a cross section on the line 2—2 of Figure 1; Figure 3 is a cross section on the line 3—3 of Figure 1.

In carrying out the invention there is provided a rim 1 having laterally extended supporting flanges 2 which are outwardly convexed, the flanges 2 extending substantially parallel to the rim, as distinguished from the ordinary clincher flange which, generally stated, projects from the rim substantially at right angles thereto. The numeral 3 marks a casing, made of fabric or rubber, or in any other way, after known methods of tire building. The longitudinal edges 4 of the casing 3 are thicker than the side walls, and rest on the flanges 2 of the rim 1.

A retainer 7, in the form of a resilient ring, extends circumferentially of the rim. The circumferential edges of the retainer or ring 7 rest on the longitudinal edges 4 of the casing 3 and are inwardly convexed, as shown at 6, so that the longitudinal edges of the casing may be compressed and held firmly, the said edges of the retainer or ring 7 coacting with the outwardly convexed flanges 2 of the rim 1, the outward convexity of the flanges 2 being designated by the numeral 5. The ends of the retainer 7 are overlapped on each other as shown in Figure 1, one end portion of the retainer being thickened as at 9 and being provided with a recess 11 defining a lip 10 which overlaps the other end of the retainer. As shown in Figures 2 and 3, the retainer or ring 7 is convexed outwardly, between the extreme inner edges of the casing 3.

A liner 12 surrounds the retainer 7, circumferentially of the wheel, and extends, as shown at 14, beyond the lateral edges of the retainer, so as to protect an inflatable inner tube 15, located within the casing and resting on the liner, the numeral 16 indicating any suitable inflating means for the inner tube 15. The ring 7 is shaped as indicated at 8 adjacent to its longitudinal edges, so as to conform to the cross section of the inner tube 16 when the latter is inflated.

When the tube 15 is inflated, pressure is exerted on the ring 7 and since the ring may be resilient, and notably in view of the fact that the ring is arched transversely, as shown in Figure 2, the longitudinal edges 4 of the casing 3 will be held tightly between the flanges 2 of the rim 1 and the longitudinal edges of the ring 7, the foregoing observation being true, notably, in view of the fact that the flanges 2 and the longitudinal edges of the ring 7 have surfaces which are convexed toward each other, for the compression of the edges 4 of the casing 3, as shown in Figure 2.

It is to be observed that the tire is of relatively small height, compared with its width. As a consequence, a broad tread surface is provided, and, further, should the tire blow out or fail otherwise, there will be no appreciable drop of the wheel. The tire will operate in a satisfactory way, with a comparatively small amount of air. The tire is so constructed that there will be a minimum amount of circumferential stress in the side walls of the casing and there will be practically no circumferential shifting of the longitudinal edges of the casing, it being possible to dispose the cords in the casing, if the casing be a cord casing, in such a way as to give the necessary results.

What is claimed is:—

1. In a device of the class described, a rim having outwardly convexed flanges located in approximate parallelism with the rim; a ring extended circumferentially of the rim and having inwardly convexed edges disposed in approximate parallelism with the rim; a casing engaged at its edges between the flanges of the rim and the edges of the ring, the ring being outwardly arched between the edges of the casing; and means for inflating the casing.

2. In a device of the class described, a rim, a ring extended circumferentially of the rim, the edges of the rim and the edges of the ring being disposed approximately parallel to the rim; a casing of appreciably greater width than height, having its edges extended inwardly toward the median plane of the casing and bound between the edges of the rim and the edges of the ring; and means for inflating the casing.

3. In a device of the class described, a rim, a ring extended circumferentially of the rim, the edges of the rim and the edges of the ring being disposed approximately parallel to the rim; a casing of appreciably greater width than height, having its edges extended inwardly toward the median plane of the casing and bound between the edges of the rim and the edges of the ring, the ring being outwardly convexed, between the edges of the casing; and means for inflating the casing.

4. In a device of the class described, a rim; an inflatable casing, of appreciably greater width than height, having its longitudinal edges supported on the rim, the longitudinal edges of the casing being inwardly extended toward the median plane of the casing, and the casing projecting outwardly beyond all portions of the rim; a ring extended circumferentially of the casing, the longitudinal edges of the ring engaging the longitudinal edges of the casing, the ring responding freely to the inflation of the casing to exert a binding action on the lonigtudinal edges of the casing, the interior of the casing presenting a cross section of substantially common height, between the ring and the tread portion of the casing; and an inflating means for the casing.

In testimony that I claim the foregoing as my own, I have hereto affixed my signature in the presence of two witnesses.

FRED BROWN PFEIFFER.

Witnesses:
L. G. MISHLER,
E. S. MILLER.